United States Patent [19]
Haake

[11] Patent Number: 5,563,967
[45] Date of Patent: Oct. 8, 1996

[54] FIBER OPTIC SENSOR HAVING A MULTICORE OPTICAL FIBER AND AN ASSOCIATED SENSING METHOD

[75] Inventor: John M. Haake, St. Charles, Mo.

[73] Assignee: McDonnell Douglas Corporation, St. Louis, Mo.

[21] Appl. No.: 472,740

[22] Filed: Jun. 7, 1995

[51] Int. Cl.$^6$ .................................. G02B 6/00; G01J 4/00
[52] U.S. Cl. ................ 385/12; 250/227.14; 250/227.18; 250/227.23; 356/345; 385/13; 385/37
[58] Field of Search .................. 385/12, 37; 250/227.14, 250/227.17, 227.18, 227.23, 227.24, 227.21; 356/345

[56] References Cited

U.S. PATENT DOCUMENTS

| | | | |
|---|---|---|---|
| 4,295,739 | 10/1981 | Meltz et al. | 385/12 |
| 5,012,090 | 4/1991 | Spillman, Jr. | 250/227.21 |
| 5,144,690 | 9/1992 | Domash | 385/12 |
| 5,324,933 | 6/1994 | Berkcan | 385/12 |
| 5,397,891 | 3/1995 | Udd et al. | 250/227.18 |
| 5,399,854 | 3/1995 | Dunphy et al. | 250/227.17 |
| 5,426,297 | 6/1995 | Dunphy et al. | 250/227.23 |
| 5,444,803 | 8/1995 | Kim et al. | 385/37 |
| 5,469,265 | 11/1995 | Measures et al. | 250/227.18 |
| 5,477,323 | 12/1995 | Andrews et al. | 385/12 |

OTHER PUBLICATIONS

M.G. Xu, J.-L. Archambault, L. Reekie and J. P. Dakin, *Thermally-compensated bending gauge using surface-mounted fibre gratings*, International Journal Of Optoelectronics, 1994, vol. 9, No. 3, pp. 281–283.

W. W. Morey, G. Meltz and W. H. Glenn, *Fiber optic Bragg grating sensors*, SPIE vol. 1169 Fiber Optic and Laser Sensors VII, 1989, pp. 98–107.

Faramarz Farahi, David J. Webb, Julian D. C. Jones and David A. Jackson, *Simultaneous Measurement of Temperature and Strain: Cross–Sensitivity Considerations*, Journal Of Lightwave Technology, vol. 8, No. 2, Feb. 1990, pp. 138–142.

M. G. Xu, J.-L. Archambault, L. Reekie and J. P. Dakin, *Discrimination between strain and temperature effects using dual–wavelength fibre grating sensors*, Electronics Letters, Jun. 23, 1994, vol. 30, No. 13, pp. 1085–1087.

*Primary Examiner*—Rodney B. Bovernick
*Assistant Examiner*—Hemang Sanghavi
*Attorney, Agent, or Firm*—Bell, Seltzer, Park & Gibson, P.A.

[57] ABSTRACT

A fiber optic sensor and associated sensing method includes a multicore optical fiber having first and second optical cores adapted to transmit optical signals having first and second predetermined wavelengths, respectively, in a single spatial mode. The first and second optical cores each include a respective Bragg grating adapted to reflect optical signals having the first and second predetermined wavelengths, respectively. Based upon the differences between the respective wavelengths of the optical signals reflected by the respective Bragg gratings and the first and second predetermined wavelengths, a predetermined physical phenomena to which the workpiece is subjected can be determined. For example, the fiber optic sensor can include strain determining means for determining the strain imparted to the workpiece. Alternatively, the fiber optic sensor can include temperature determining means for determining the temperature to which the workpiece is subjected. Further, the fiber optic sensor can include both strain determining means and temperature determining means for simultaneously determining the strain and temperature to which a workpiece is subjected. The fiber optic sensor also includes calibration means for measuring the predetermined physical phenomena, independent of variations in other physical phenomena.

20 Claims, 4 Drawing Sheets

FIBER OPTIC SENSOR HAVING A MULTICORE OPTICAL FIBER AND AN ASSOCIATED SENSING METHOD

GOVERNMENT RIGHTS

The United States Government has rights in this invention pursuant to a contract awarded by the department of the Navy.

FIELD OF THE INVENTION

The present invention relates generally to fiber optic sensors and associated sensing methods and, more particularly, to fiber optic sensors having a Bragg grating for selectively reflecting light of a predetermined wavelength and associated sensing methods.

BACKGROUND OF THE INVENTION

Fiber optic sensors are employed in a variety of applications due, at least in part, to their sensitivity and immunity to environmental conditions. More particularly, interferometric fiber optic sensors in which the velocity, phase or wavelength of the propagating light is modified in response to a sensed phenomena are employed in a variety of applications. For example, optical fiber gyroscopes are commonly employed to measure the rotation rate, such as the rotation rate of an aircraft.

By varying the construction of the fiber optic sensor, a fiber optic sensor can detect a variety of physical phenomena, including acoustic, magnetic and electric energy. In addition to these physical phenomena, it is oftentimes desirable to measure the strain imparted to a workpiece or the temperature to which a workpiece is subjected.

For example, one emerging application in which fiber optic sensors are desirably employed is smart structures. As known to those skilled in the art, smart structures generally refer to structures, such as composite structures, which incorporate interactive electrical devices for monitoring or actively controlling the performance or behavior of the smart structure. For example, a smart structure can include an electroceramic actuator which induces vibrations within the smart structure to damp or offset externally induced vibrations in the smart structure.

In order to monitor the conditions to which a smart structure is subjected, it is desirable to include a sensor, such as a fiber optic sensor, within the smart structure. For example, the fiber optic sensor can be embedded within the plies of the composite structure so as to determine the strain or temperature to which the workpiece is subjected.

In order to measure the strain imparted to a workpiece or the temperature to which a workpiece is subjected, a variety of fiber optic sensors have been developed, including fiber optic sensors designed to be embedded within smart structures. In particular, fiber optic sensors having a Bragg grating written thereon have been developed to measure the strain imparted to a workpiece. As known to those skilled in the art, a Bragg grating reflects optical signals having a predetermined wavelength. However, the predetermined wavelength of the reflected signals shifts somewhat as the sensor, and therefore the workpiece to which the sensor is mounted, is subjected to strain. This shift in the reflected wavelength is based, at least in part, upon the photoelastic and thermo-optic coefficients of the optical fiber. Thus, based upon the wavelength shift of the reflected optical signals, a fiber optic sensor can measure the strain imparted to a workpiece.

As known to those skilled in the art, however, fiber optic sensors are sensitive to temperature variations such that the shift in the wavelength of the reflected light varies not only in response to strain imparted to the workpiece, but also in response to temperature variations. Accordingly, a conventional fiber optic sensor cannot accurately determine the strain imparted to a workpiece which is disposed in an environment in which the temperature can vary if the fiber optic sensor cannot differentiate between shifts in the wavelength of reflected light due to strain and temperature changes.

Accordingly, a variety of fiber optic sensors have been developed to detect the strain imparted to a workpiece, independent of temperature fluctuations in the surrounding environment. See F. Farahi, et al., "Simultaneous Measurement of Temperature and Strain: Cross-Sensitivity Considerations", Journal of Lightwave Technology, Vol. 8, No. 2, pp. 138–42 (February 1990). For example, a fiber optic sensor having two Bragg gratings surface mounted on opposite surfaces of a bent cantilever beam was proposed to provide a thermally compensated strain gauge. See M. G. Xu, et al., "Thermally-Compensated Bending Gauge Using Surface-Mounted Fibre Gratings", Int'l. Journal of Optoelectronics, Vol. 9, No. 3, pp. 281–82 (1994).

Another fiber optic sensor for detecting the strain imparted to a workpiece, independent of temperature fluctuations, has been proposed by M. G. Xu et al. in a paper entitled Discrimination Between Strain And Temperature Effects Using Dual-Wavelength Fibre Grating Sensors, published in Electronics Letters, Vol. 30, No. 13, pages 1085–87 (Jun. 23, 1994). The dual-wavelength fiber optic sensor proposed by Xu et al. includes an optical fiber having two superimposed Bragg gratings written thereon. The two superimposed Bragg gratings are designed to reflect optical signals having two distinct predetermined wavelengths, such as 850 nanometers and 1300 nanometers. The dual-wavelength fiber optic sensor also includes a remote first and second edge light emitting diodes (ELED's) which transmit first and second optical signals, respectively, having the two distinct predetermined wavelengths through opposite ends of the optical fiber. Based upon differences in the respective wavelength shifts of the first and second optical signals as reflected by the two superimposed Bragg gratings, the strain imparted to the workpiece can be determined independent of temperature fluctuations.

As known to those skilled in the art, the light reflected by a Bragg grating of an optical fiber has different wavelength shifts at different transmitted wavelengths. This difference in the wavelength shifts increases as optical signals having larger differences in wavelengths are transmitted therethrough.

As known to those skilled in the art, an optical fiber is single mode, i.e., the optical fiber transmits optical signals in a single spatial mode, for optical signals having a wavelength within a first predetermined range of wavelengths. Consequently, the optical fiber is also typically multimode for optical signals having wavelengths outside of the first predetermined range such that the resulting optical signal transmission is less efficient. In addition, the range of wavelengths for which an optical fiber is single mode also generally decreases as the optical fiber is bent or is strained. For example, optical fibers which transmit signals in a single mode at 1300 nanometers are typically multimode for optical signals having a significantly shorter wavelength, such as 850 nanometers particularly in instances in which the optical fiber is bent or otherwise subjected to strain. Accordingly, once the dual-wavelength fiber optic sensor of Xu, et al. is subjected to strain or is bent, the dual-wavelength fiber optic sensor, which transmits and reflects optical signals having significantly different wavelengths, may be multimode for at least some of the optical signals. Therefore, the efficiency with which the dual-wavelength fiber optic sensor transmits and detects optical signals decreases which, in turn, can decrease both the sensitivity of the fiber optic sensor and the efficiency at which the multimode optical signal transmits through other optical devices, such as fiber couplers or any other fiber optic-based devices that require the light traveling through the optical fiber to be single mode.

The dual-wavelength fiber optic sensor of Xu, et al. also includes first and second fiber couplers for coupling the optical signals transmitted by a respective ELED to the optical fiber and for coupling the reflected optical signals from the optical fiber to an optical spectrum analyzer. Since optical signals having two distinct wavelengths are transmitted and reflected via the single optical fiber of the dual-wavelength fiber optic sensor, the first and second fiber couplers must generally be first and second wavelength division couplers. As known to those skilled in the art, wavelength division couplers separate optical signals based upon the respective wavelengths of the optical signals. Accordingly, reflected optical signals having different wavelengths can be separated and individually analyzed. However, wavelength division couplers are relatively expensive so as to thereby increase the expense and complexity of the resulting dual-wavelength fiber optic sensor. In addition, a wavelength division coupler cannot generally be used with multimode optical fibers.

SUMMARY OF THE INVENTION

It is therefore an object of the present invention to provide an improved fiber optic sensor for detecting the strain imparted to a workpiece.

It is another object of the present invention to provide a fiber optic sensor for detecting the strain imparted to a workpiece independent of temperature fluctuations.

It is another object of the present invention to provide an improved fiber optic sensor for detecting the temperature to which a workpiece is subjected.

It is yet another object of the present invention to provide an improved fiber optic sensor for detecting the temperature to which a workpiece is subjected, independent of the strain imparted to the workpiece.

It is still another object of the present invention to provide an improved fiber optic sensor for simultaneously detecting both the strain and temperature to which a workpiece is subjected.

It is a further object of the present invention to provide an improved method for sensing a predetermined phenomena, such as temperature or strain, to which a workpiece is subjected.

These and other objects are provided, according to the present invention, by a fiber optic sensor having a multicore optical fiber associated with a workpiece for transmitting and reflecting optical signals having first and second predetermined wavelengths and for determining the magnitude of a predetermined phenomena, such as strain or temperature, to which the workpiece is subjected based upon the respective wavelength shifts of the first and second reflected optical signals. The multicore optical fiber of one embodiment includes first and second optical cores surrounded by a cladding layer and adapted to transmit optical signals having first and second predetermined wavelengths, respectively, in a single spatial mode. The first and second optical cores also include a respective Bragg grating adapted to reflect optical signals having first and second predetermined wavelengths, respectively. Accordingly, based upon the differences between the first and second predetermined wavelengths of the optical signals originally transmitted by the first and second optical fibers, respectively, and the respective wavelengths of the optical signals reflected by the respective Bragg gratings, the predetermined physical phenomena, such as strain or temperature or both, can be determined, independent of perturbations caused by other physical phenomena.

The fiber optic sensor of the present invention can also include first and second optical sources for generating the optical signals having first and second predetermined wavelengths, respectively. The first and second optical sources are coupled to first ends of the first and second optical cores, respectively, for transmitting optical signals therethrough. In addition, the fiber optic sensor of the present invention can include first and second detectors coupled to the first and second optical cores of the multicore optical fiber, respectively, for detecting optical signals reflected by the respective Bragg grating of the first and second optical cores.

In one embodiment, the fiber optic sensor of the present invention includes strain determining means, operably connected to the first and second detectors, for determining the strain imparted to the workpiece. In another embodiment, the fiber optic sensor can include temperature determining means, operably connected to the first and second detectors, for determining the temperature to which the workpiece is subjected. The fiber optic sensor of one embodiment can include both strain determining means and temperature determining means so as to simultaneously detect the strain and temperature to which the workpiece is subjected. In either embodiment, the predetermined phenomena, such as strain or temperature or both, is determined based upon the difference between the respective wavelength changes of the optical signals reflected by a respective Bragg grating and detected by the first and second detectors and the first and second predetermined wavelengths of the originally transmitted optical signals, respectively.

The fiber optic sensor of the present invention can also include calibration means for determining the respective wavelength shifts of optical signals originally having first and second predetermined wavelengths due to the application of predetermined amounts of strain to a workpiece which is maintained at a constant temperature. The calibration means can also include means for determining the respective wavelength shifts of optical signals originally having first and second predetermined wavelengths as a result of subjecting the workpiece to predetermined temperature variations while imparting a constant strain to the workpiece. Thus, the effect of a predetermined physical phenomena, such as strain or temperature on the fiber optic sensor, such as the shift in wavelength of light reflected by a Bragg grating, can be determined independent of variations by other physical phenomena.

In one embodiment, the first optical source and the first detector are coupled to the first optical core by a first optical coupler. Likewise, the second optical source and the second detector of this embodiment are preferably coupled to the second optical core by a second optical coupler. Thus, the first and second optical sources can transmit optical signals having first and second predetermined wavelengths, such as 670 nanometers and 1550 nanometers, respectively, through the first and second optical cores, respectively.

In addition, the respective Bragg gratings of the first and second optical cores are preferably created at first and second predetermined spatial locations, respectively, relative to their respective first ends of the first and second optical cores. According to one advantageous embodiment, the first and second predetermined spatial locations are identical.

Accordingly, the fiber optic sensor and associated sensing method of the present invention can detect a predetermined phenomena, such as strain or temperature, to which a workpiece is subjected, independent of variations in other physical phenomena. For example, the strain to which the workpiece is subjected can be determined independent of temperature fluctuations. Likewise, the temperature to which the workpiece is subjected can be determined independent of the strain imparted to the workpiece. Still further, both the strain and temperature to which the workpiece is subjected can be simultaneously determined.

In addition, since the fiber optic sensor of the present invention includes a multicore optical fiber having a plurality of optical cores, each optical core can be individually optimized to transmit optical signals having the respective predetermined wavelength in a single spatial mode. Thus, the efficiency and sensitivity of the fiber optic sensor of the present invention is improved. The fiber optic sensor of the present invention can also be simplified in comparison with conventional fiber optic sensors since the optical signals reflected by the respective Bragg gratings of the first and second optical cores need not be separated, such as with a wavelength division coupler, in order to detect the respective wavelength shifts. Further, by employing first and second optical signals having relatively widely separated wavelengths, such as 670 nanometers and 1550 nanometers, the sensitivity of the resulting fiber optic sensor can be further enhanced since the effects of the various phenomena can be further differentiated.

DETAILED DESCRIPTION OF THE PREFERRED EMBODIMENTS

The present invention will now be described more fully hereinafter with reference to the accompanying drawings, in which a preferred embodiment of the invention is shown. This invention may, however, be embodied in many different forms and should not be construed as limited to the embodiments set forth herein; rather, this embodiment is provided so that this disclosure will be thorough and complete and will fully convey the scope of the invention to those skilled in the art. Like numbers refer to like elements throughout.

Figure 1:
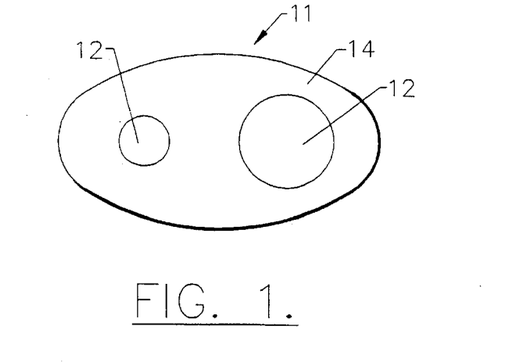
FIG. 1 is a cross-sectional view of a multicore optical fiber of a fiber optic sensor of one embodiment of the present invention.
Figure 2A:
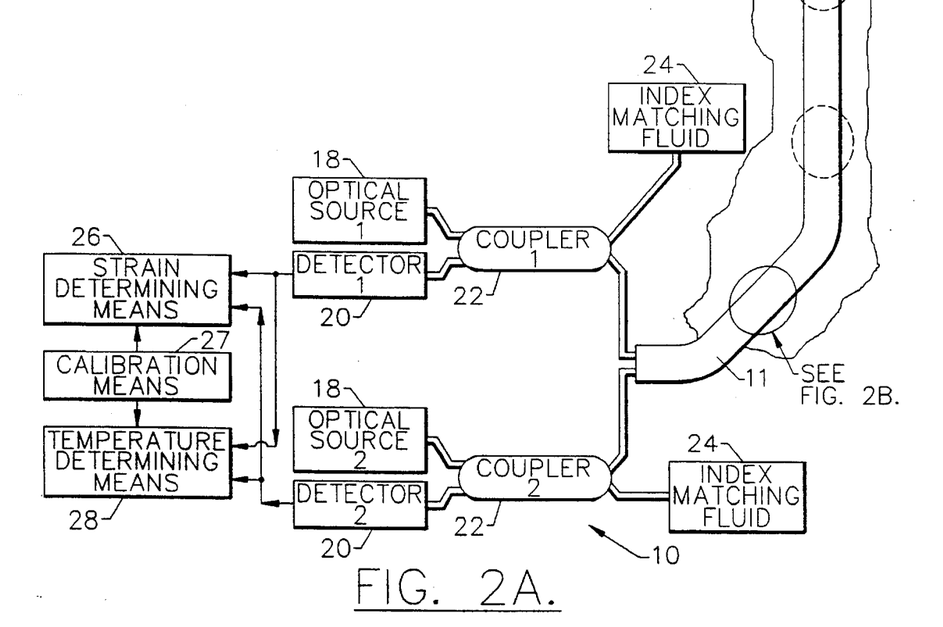
FIG. 2A is a schematic representation of a fiber optic sensor of one embodiment of the present invention.

Referring now to FIGS. 1 and 2A, a fiber optic sensor 10 according to the present invention is illustrated. The further optic sensor can be mounted upon or within a workpiece, such as a composite structure and, in one embodiment, a smart composite structure, to determine a predetermined physical phenomena to which the workpiece is subjected. For example, the fiber optic sensor can determine the strain imparted to the workpiece, the temperature to which the workpiece is subjected or both.

The fiber optic sensor 10 includes a multicore optical fiber 11 having a plurality of optical cores 12 surrounded by a common cladding layer 14. In the illustrated embodiment, the multicore optical fiber includes a pair of optical cores. For example, a dual-core optical fiber is commercially available from Ericsson.

As illustrated in cross section in FIG. 1, the first and second optical cores 12 of the multicore optical fiber 11 are adapted to transmit optical signals having first and second wavelengths, respectively. In one embodiment, the optical cores are comprised of germanium-doped silica in which the germanium doping is controlled such that the first and second optical cores transmit optical signals having the first and second predetermined wavelengths, respectively, in a single spatial mode. By transmitting optical signals of the predetermined wavelength in a single mode, the transmission efficiency of the optical fiber is significantly enhanced.

As illustrated in FIG. 1, the multicore optical fiber 11 also includes a cladding layer 14 which surrounds each optical core 12. Typically, the cladding layer is comprised of fused silica. As known to those skilled in the art, the mode in which an optical fiber transmits an optical signal is also dependent upon the size of the optical core and the index step between the optical core and the cladding layer. Thus, the size of the optical core and the index step between the optical core and the cladding preferably selected such that the optical core is single mode for optical signals having the predetermined wavelength. For example, in one embodiment, the optical core of a dual core optical fiber adapted to preferentially transmit signals having a wavelength of 1300 nm has a diameter of 8.3 μm and the optical fiber has an index step ($\Delta n$) of 0.35% (0.0035) between the optical core and the cladding layer.

In order to further increase the sensitivity of the fiber optic sensor 10 of the present invention as described above, the first and second predetermined wavelengths are preferably widely separated, such as by greater than 700 nanometers in one exemplary embodiment. In addition, the first predetermined wavelength is preferably 50% or less of the second predetermined wavelength. For example, in one advantageous embodiment, the first optical core is adapted to transmit optical signals center about a wavelength of 670 nanometers in a single spatial mode. In this embodiment, the second core is preferably adapted to transmit optical signals centered about a wavelength of 1550 nanometers in a single spatial mode.

Each optical core 12 of the multicore optical fiber 11 also includes a respective Bragg grating 16. As known to those skilled in the art, a Bragg grating reflects optical signals having a predetermined wavelength. Accordingly, the Bragg gratings of the first and second optical cores of the fiber optic sensor of the present invention are adapted to reflect optical signals having the first and second predetermined wavelengths, respectively. For example, the Bragg gratings of the first and second optical cores can be adapted to reflect optical signals having wavelengths of 670 nanometers and 1550 nanometers, respectively.

As known to those skilled in the art, a Bragg grating 16 is written on a respective optical core 12, such as by exposing the optical core to a predetermined holographic pattern. The holographic pattern can be defined by a pair of interfering laser beams which create an intensity or interference pattern which, in turn, alters the refractive index of the optical core. See, for example, W. W. Morey, et al., "Fiber Optic Bragg Grating Sensors", SPIE Proc. Fiber Optic and Laser Sensors VII, Vol. 1169, pp. 98–107 (1989).

The respective Bragg gratings 16 of the first and second optical cores 12 are disposed at first and second predetermined spatial locations, respectively, relative to the respective first ends of the first and second optical cores. In one advantageous embodiment, the respective Bragg gratings are superimposed such that the first and second predetermined spatial locations are identical as shown in the circled portion of the optical fiber 11 of FIG. 2B, which is greatly enlarged and from which the cladding layer 14 has been removed for purposes of illustration.

Figure 6A:
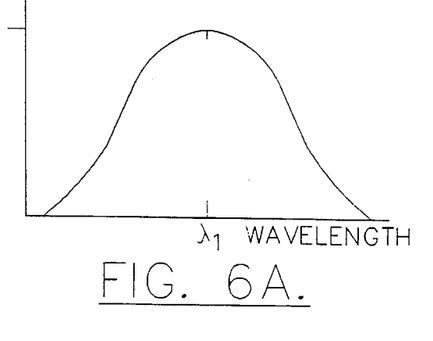
FIGS. 6A and 6B are graphical representations of the predetermined distribution of wavelengths of the optical signals emitted by the first and second optical sources, respectively.
Figure 6B:
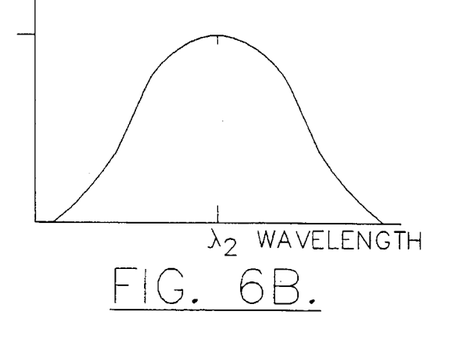

As also illustrated schematically in FIG. 2A, the fiber optic sensor 10 can include first and second optical sources 18 for generating optical signals having first and second predetermined wavelengths, respectively. The optical sources are preferably broadband sources, such as light emitting diodes, which generate optical signals having first and second predetermined ranges of wavelengths as shown in FIGS. 6A and 6B, respectively. The first and second predetermined ranges of wavelengths preferably include and, in one embodiment, are centered about, the first and second predetermined wavelengths, respectively.

In addition, while a fiber optic sensor 10 having one set of Bragg gratings 16 will be described in detail hereinafter, the fiber optic sensor can include a plurality of sets of Bragg gratings. As shown in FIG. 2A, the plurality of sets of Bragg gratings, depicted within dashed circles for purposes of illustration, are preferably spaced apart and can be adapted to preferentially reflect optical signals having different wavelengths. For example, in one embodiment, each set of the plurality of Bragg grating sets can be a point sensor to sense the strain and/or temperature to which the workpiece is subjected at its respective location.

Figure 6C:
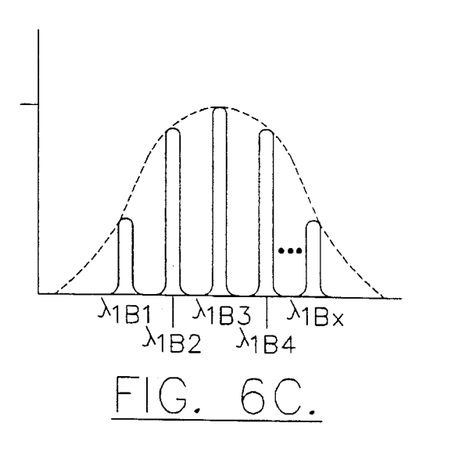
FIGS. 6C and 6D are graphical representations of the wavelengths of respective signals reflected by a fiber optic sensor of one embodiment of the present invention which includes a plurality of sets of Bragg gratings and which also graphically illustrates the bandwidth of the optical signals emitted by a respective optical source in dashed lines for illustrative purposes.
Figure 6D:
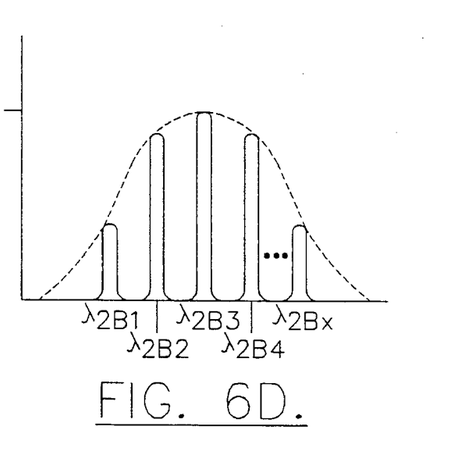

In this embodiment, each Bragg grating 16 preferably reflects optical signals having a wavelength within the bandwidth of the respective optical source 18. Preferably, in addition, each Bragg grating reflects optical signals having a different wavelength within the bandwidth of the optical source such that the respective reflected signals can be detected and differentiated. For example, the first set of Bragg gratings preferably reflects optical signals having wavelengths of $\lambda 1B1$ and $\lambda 2B1$, the second set of Bragg gratings preferably reflects optical signals having wavelengths of $\lambda 1B2$ and $\lambda 2B2$, and so on as shown in FIGS. 6C and 6D.

As shown, the first and second optical sources 18 are coupled to respective first ends of the first and second optical cores 12 of the multicore optical fiber 11, respectively. The first and second optical sources can be coupled to the respective first ends of the first and second optical cores by first and second optical couplers 20. Suitable optical couplers, which, for example, are adapted to couple or pass optical signals having the first and second predetermined wavelengths, respectively, such as 670 nanometers and 1550 nanometers in one exemplary embodiment, and are commercially available from Gould Fiber Optics of Millersville, Md.

The fiber optic sensor 10 of the present invention can also include first and second detectors 22, coupled to the respective first ends of the first and second optical cores 12 of the multicore optical fiber 11, respectively. The first and second detectors detect the optical signals reflected by the respective Bragg gratings 16 of the first and second optical cores, respectively. In one embodiment, the first and second detectors include first and second demodulating systems which transform the wavelength of the detected optical signals to corresponding voltages for subsequent processing as known to those skilled in the art. For example, a demodulating system is commercially available from Electrophotonics of Dounsutew, Ontario, Canada.

Figure 3:
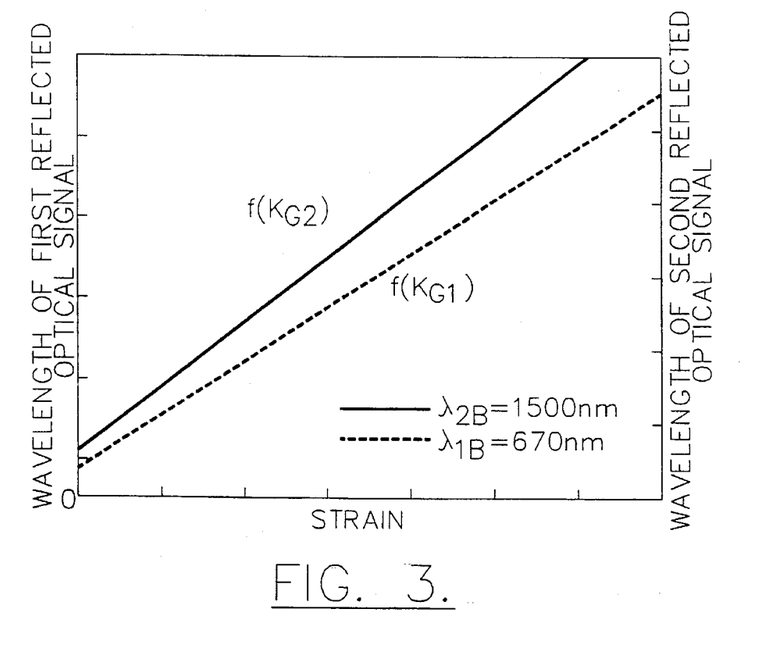
FIG. 3 is a graphical representation of the respective wavelength shifts of optical signals originally transmitted with first and second predetermined wavelengths due to strain imparted to a workpiece.

As illustrated in FIG. 3, the first and second detectors 22 can be coupled to the respective first ends of the first and second optical cores, respectively, by the first and second optical couplers 20, respectively. As known to those skilled in the art, the optical coupler can be a 2×1 optical couplers or a 2×2 optical coupler. For illustrative purposes, a 2×2 coupler as shown in FIG. 3 in which the terminal end of one lead is disposed within an index matching fluid 24, such as Cargille brand fluid, to reduce or eliminate reflections or interference therefrom. Alternatively, the terminal end of one lead can be coupled to another fiber optic sensor. In either embodiment, the fiber optic sensor 10 of the present invention can include a variety of other optical couplers to pass optical signals of a predetermined wavelength without departing from the spirit and scope of the present invention.

The remaining leads of the optical couplers 20 are connected to an optical source 18, a detector 22 and an optical core 12 of the multicore optical fiber 11. For example, one lead of the optical coupler can be coupled to a respective first end of an optical core by fusion splicing or other methods known to those skilled in the art.

In one embodiment, the fiber optic sensor 10 is adapted to measure strain in a workpiece. In this embodiment, the fiber optic sensor includes strain determining means 26, operably connected to the first and second detectors 20 as illustrated in FIG. 2A, for determining the strain imparted to the workpiece. As described below, the strain is determined by the strain determining means based upon the difference between the respective wavelengths of the reflected optical signals detected by the first and second detectors 22 and the first and second predetermined wavelengths of the optical signals originally transmitted by the first and second optical sources 18, respectively.

In particular, the strain imparted to a workpiece and the temperature to which the workpiece is subjected can each shift the wavelength of light reflected by a Bragg grating 16 as described above. In particular, the respective changes in the wavelength of light reflected by a Bragg grating in response to changes in strain $\Delta\epsilon$ imparted to the workpiece and changes in the temperature $\Delta T$ to which the workpiece is subjected can be expressed as:

$$\Delta\lambda_\epsilon = K_\epsilon \Delta_\epsilon \qquad (1)$$

$$\Delta\lambda_T = K_T \Delta T \qquad (2)$$

wherein $\Delta\lambda_\epsilon$ is the change in the wavelength of light reflected by a Bragg grating due to stain imparted to the workpiece, wherein $\Delta\lambda_T$ is the change in the wavelength of light reflected by a Bragg grating due to temperature fluctuations, and wherein $K_\epsilon$ and $K_T$ are constants relating the rate of change of the predetermined phenomena, such as strain or temperature, to the change in the wavelength of light reflected by the Bragg grating.

Accordingly, the cumulative change in wavelength $\Delta\lambda_B$ reflected by a Bragg grating 16 is equal to:

$$\Delta\lambda_B = K_\epsilon \Delta\epsilon + K_T \Delta T \qquad (3)$$

In order to determine the magnitude of a predetermined phenomena to which a workpiece is subjected independent of the effects of other phenomena to which the workpiece is subjected, the fiber optic sensor 11 of the present invention includes calibration means 27. Accordingly, the fiber optic sensor can determine the strain imparted to a workpiece independent of any effects which temperature variations may have on the workpiece. Likewise, the fiber optic sensor can determine the temperature to which a workpiece is subjected independent of any effects which strain can have on the workpiece. Furthermore, the fiber optic sensor can simultaneously determine both the strain and temperature to which a workpiece is subjected.

Figure 2B:
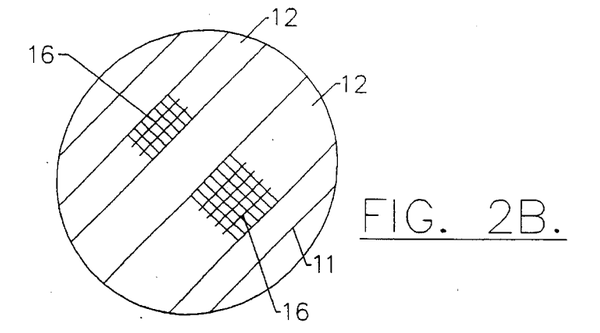
FIG. 2B illustrates, in greatly enlarged fashion, the superimposed Bragg gratings which are written on the first and second optical cores of the multicore optical fiber depicted in FIG. 2A.

In addition, optical fibers generally provide somewhat different responses to variations in physical phenomena, such as strain or temperature, for optical signals having different wavelengths due to dispersion. Thus, the respective changes in the wavelength $\Delta\lambda_B$ of light reflected by a Bragg grating 16 at the first and second predetermined wavelengths $\lambda_1$ and $\lambda_2$ are equal to:

$$\Delta\lambda_{B1} = K_{\epsilon1}\Delta\epsilon + K_{T1}\Delta T \qquad (4)$$

$$\Delta\lambda_{B2} = K_{\epsilon2}\Delta\epsilon + K_{T2}\Delta T \qquad (5)$$

wherein $\Delta\lambda_{B1}$ and $\Delta\lambda_{B2}$ are the respective changes in the wavelength of light reflected by a Bragg grating at the first and second predetermined wavelengths $\lambda_1$, and $\lambda_2$, respectively. While the changes in wavelength occasioned by a first set of Bragg gratings are described herein, the fiber optic sensor 10 can include a plurality of sets of Bragg gratings as described above and as illustrated in FIGS. 2A and 2B, without departing from the spirit and scope of the present invention.

In particular, the calibration means 27 of the fiber optic sensor 11 preferably includes means for determining the respective wavelength shifts of reflected optical signals originally having first and second predetermined wavelengths due to the application of predetermined amounts of strain to a workpiece which is maintained at a constant temperature. For example, the respective wavelength shifts of reflected optical signals originally having first and second predetermined wavelengths, such as 670 nanometers and 1550 nanometers, due to the application of predetermined amounts of strain to a workpiece which is maintained at a constant temperature can be graphically depicted as shown in FIG. 3.

Figure 4:
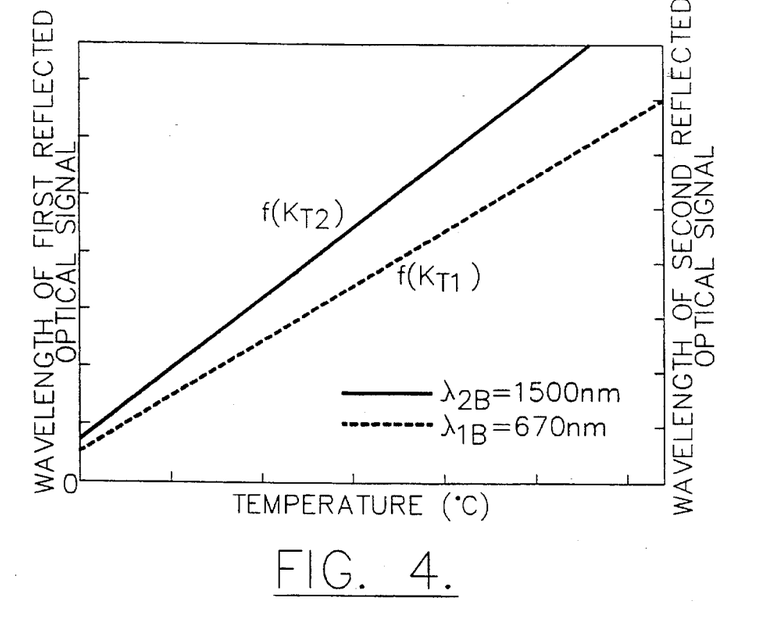
FIG. 4 is a graphical representation of the respective wavelength shifts of the optical signals originally transmitted with first and second predetermined wavelengths due to variations in the temperature to which a workpiece is subjected.

In addition, the calibration means 27 can include means for determining the respective wavelength shifts of reflected optical signals originally having first and second predetermined wavelengths as a result of subjecting the workpiece to predetermined temperature variations while maintaining the strain imparted to the workpiece at a constant level. As shown in FIG. 4, the wavelength shifts of reflected optical signals originally having first and second predetermined wavelengths, such as 670 nanometers and 1550 nanometers, vary linearly as the temperature to which the workpiece is subjected fluctuates, even though the strain imparted to the workpiece is maintained at a constant level.

Based upon the relationship between the wavelength shifts of the reflected optical signals originally having the first and second predetermined wavelengths as shown in FIGS. 3 and 4, the various constants, such as $K_{\epsilon1}$, $K_{T1}$, $K_{\epsilon2}$, $K_{T2}$, relating the rate of change of a predetermined phenomena to the change in the wavelength of light reflected by a Bragg grating can be determined. In particular, the various constants can be determined based upon the slope of a respective curve as shown in FIGS. 3 and 4. Therefore, the strain determining means 26 can determine the strain imparted to the workpiece, independent of the effects of any temperature fluctuations to which the workpiece is subjected, by determining the respective wavelength shifts $\Delta\lambda_{B1}$ and $\Delta\lambda_{B2}$ of the reflected optical signals which were originally transmitted with first and second predetermined wavelengths, respectively, and by solving equations (4) and (5) for $\Delta\epsilon$.

According to another embodiment, the fiber optic sensor 11 of the present invention can include temperature determining means 28, operably connected to the first and second detectors 20, for determining the temperature to which the workpiece is subjected. As described above in conjunction with the strain determining means 26, the temperature determining means determines the temperature to which the workpiece is subjected based upon the respective wavelength shifts $\Delta\lambda_{B1}$ and $\Delta\lambda_{B2}$ of the reflected optical signals originally transmitted with the first and second predetermined wavelengths, respectively. In particular, the temperature determining means determines the temperature to which the workpiece is subjected by determining the respective wavelength shifts of the reflected optical signals and by solving equations (4) and (5) for $\Delta T$. Therefore, the temperature to which the workpiece is subjected can be determined independent of any differences in the respective wavelengths of the reflected optical signals due to variations in the strain imparted to the workpiece.

In addition, in one advantageous embodiment, the fiber optic sensor 10 includes both strain determining means 26 and temperature determining means 28. In this embodiment, the fiber optic sensor can simultaneously determine the strain and temperature to which the workpiece is subjected based upon the respective wavelength shifts of the reflected optical signals as described above.

Figure 5:
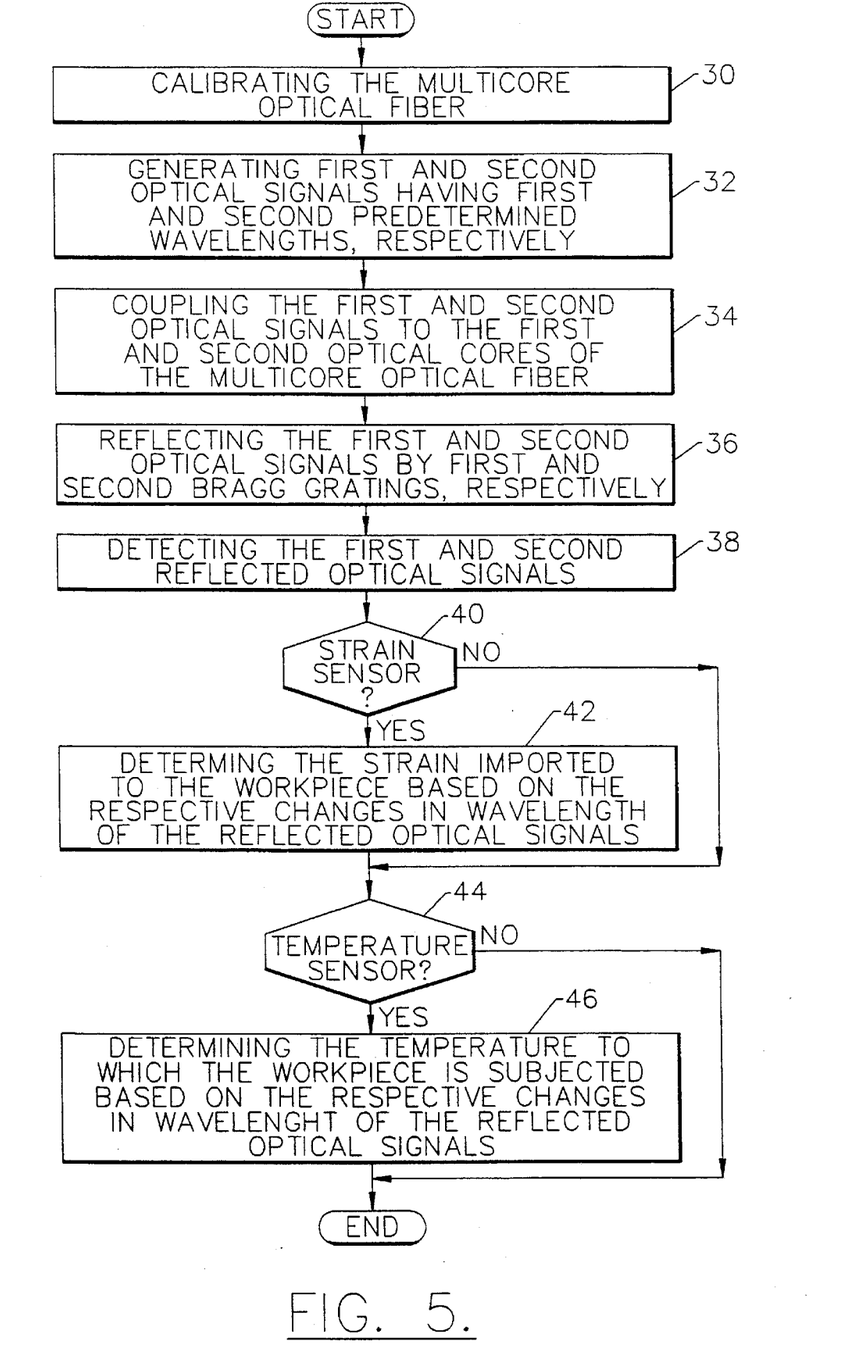
FIG. 5 is a flow chart illustrating the operations of a fiber optic sensor and associating sensing method of one embodiment of the present invention.

Accordingly, once the fiber optic sensor 10 has been calibrated, such as with calibrating means 27, the first and second optical sources 18 generate first and second optical signals, respectively, having first and second predetermined wavelengths, respectively, as shown in blocks 30 and 32 of FIG. 5. The first and second optical signals are coupled to first and second optical cores 12, respectively, of a multicore optical fiber, as illustrated in block 34. The optical fiber signals transmitted by the first and second optical cores are reflected by first and second Bragg gratings 16 written on the first and second optical cores, respectively, as shown in block 36, to thereby create first and second resonant signals. As illustrated in block 38 of FIG. 5, the first and second resonant signals are detected, such as by first and second detectors 22, respectively.

Based upon the difference between the respective wavelengths of the first and second resonant signals and the first and second predetermined wavelengths of the optical signals as originally transmitted, respectively, the magnitude of a predetermined phenomena to which the workpiece is subjected, such as strain or temperature or both, can be determined as described above. For example, the strain to which the workpiece is subjected can be determined as shown in blocks 40 and 42 of FIG. 5, while the temperature to which the workpiece is subjected can be determined as shown in blocks 44 and 46. While the steps of determining the strain and temperature are shown as separate blocks in FIG. 5, these steps can be simultaneously performed in one advantageous embodiment of the present invention.

While a multicore optical fiber 11 having first and second optical cores 12 surrounded by a cladding layer 14 has been described herein, the multicore optical fiber could have any number of optical cores surrounded by a cladding layer without departing from the spirit and scope of the present invention. In this embodiment, each optical core would preferably be designed or doped so as to selectively transmit optical signals having a predetermined wavelength in a single spatial mode. In addition, each optical core would preferably have a Bragg grating 16 written thereon at a predetermined spatial location for reflecting light of the predetermined wavelength which the optical core is designed to transmit.

As illustrated in FIGS. 3 and 4 and described above, the wavelength shifts of the optical signals reflected by the respective Bragg gratings 16 due to the various physical phenomena to which the workpiece is subjected vary based upon the wavelength of the signals transmitted by the optical core 12, due to the dispersion of the optical core. Generally, greater differences between the respective wavelength shifts of reflected optical signals are provided by optical cores which are adapted to transmit optical signals having predetermined wavelengths which are more widely separated than by single or Inomidial optical cores which are adapted to transmit more closely related wavelengths. By providing greater differences between the respective wavelength shifts of optical signals having widely separated predetermined wavelengths, the sensitivity of the fiber optic sensor 10 is generally improved such that the magnitude of the phenomena to which the optical fiber 11 is exposed can be more accurately determined.

Accordingly, the ratio of the first and second predetermined wavelengths which the first and second optical cores 12 are designed to transmit in single mode is preferably ½ or less in order to provide such increased sensitivity. For example, the multicore optical fiber 11 described above includes first and second optical cores designed to transmit optical signals having relatively widely separated predetermined wavelengths, such as 670 nanometers and 1550 nanometers, which have a wavelength difference of at least 700 manometers, and which define a ratio of less than ½. However, the multicore optical fiber of the present invention can transmit optical signals having a variety of predetermined wavelengths without departing from the spirit and scope of the present invention.

While a fiber optic sensor 10 having a multicore optical fiber 11 with first and second optical cores 12 adapted to preferentially transmit optical signals having the first and second predetermined wavelengths has been described above, the first and second optical cores could, instead, be adapted to preferentially transmit optical signals having the same wavelength, while continuing to detect predetermined phenomena to which the workpiece is subjected based upon the selective doping of the optical cores. In particular, the first and second optical cores can be doped with different dopants such that the optical cores preferentially transmit optical signals having the same wavelength, but have different constants $K_E$ and $K_T$ relating to the rate of change of the predetermined phenomena, such as strain or temperature, to the change in the wavelength of the optical signals reflected by the respective Bragg grating 16 as described above. Accordingly, based upon changes in wavelength of the optical signals reflected by the respective Bragg gratings, the predetermined phenomena, such as strain, temperature or both, to which the workpiece is subjected can be determined as also explained above.

The fiber optic sensor 10 and associated sensing method of the present invention can therefore detect a predetermined phenomena, such as strain and/or temperature, to which a workpiece is subjected independent of the effects of other physical phenomena. For example, the strain to which the workpiece is subjected can be determined independent of the effects of temperature fluctuations. Likewise, the temperature to which the workpiece is subjected can be determined independent of the effects of strain imparted to the workpiece. Further, both the strain and temperature to which the workpiece is subjected can be determined, preferably simultaneously, by the fiber optic sensor of one advantageous embodiment.

The first and second optical cores 12 of the multicore optical fiber 11 of the fiber optic sensor 10 of the present invention can also be designed to transmit optical signals having first and second predetermined wavelengths, respectively, in a single spatial mode, thereby increasing the efficiency and sensitivity of the sensor. Likewise, the fiber optic sensor can be simplified in comparison with conventional fiber optic sensors since the reflected optical signals are transmitted by separate optical cores and, consequently, need not be separated, such as with a wavelength division coupler, in order to detect the respective wavelength shifts. Further, the optical cores of the fiber optic sensor of the present invention are individually designed to efficiently transmit optical signals in a single spatial mode which have first and second relatively widely separated wavelengths, thereby further enhancing the accuracy and sensitivity of the fiber optic sensor.

In the drawings and the specification, there has been set forth preferred embodiments of the invention and, although specific terms are employed, the terms are used in a generic and descriptive sense only and not for purpose of limitation, the scope of the invention being set forth in the following claims.

That which is claimed is:

1. A fiber optic sensor for measuring strain in a workpiece independent of variations in temperature to which the workpiece is subjected, the fiber optic sensor comprising:

a multicore optical fiber comprising:

first and second optical cores adapted to transmit optical signals having first and second predetermined wavelengths, respectively, in a single spatial mode, wherein the first and second predetermined wavelengths are different, and wherein said first and second optical cores include a respective Bragg grating at the same relative spatial location which is adapted to reflect optical signals having the first and second predetermined wavelengths, respectively; and a cladding layer surrounding each of said first and second optical cores;

first and second optical sources for generating optical signals having first and second predetermined wavelengths, respectively, said first and second optical sources being coupled to said first and second optical cores of said multicore optical fiber, respectively, for transmitting the optical signals therethrough;

first and second detectors, coupled to said first and second optical cores of said multicore optical fiber, respectively, for detecting optical signals reflected by the respective Bragg grating of said first and second optical cores; and strain determining means, operably connected to said first and second detectors, for determining the strain imparted to the workpiece, independent of variations in the temperature to which the workpiece is subjected, based upon the difference between the respective wavelengths of the optical signals detected by said first and second detectors and the first and second predetermined wavelengths, respectively.

2. A fiber optic sensor according to claim 1 wherein said strain determining means comprises calibration means comprising:

means for determining the respective wavelength shifts of optical signals originally having first and second predetermined wavelengths due to the application of predetermined amounts of strain to the workpiece which is maintained at a constant temperature; and means for determining the respective wavelength shifts of optical signals originally having first and second predetermined wavelengths as a result of subjecting the workpiece to predetermined temperature variations while maintaining the strain to which the workpiece is subjected constant, such that said strain determining means determines the strain imparted to the workpiece independent of any differences in the respective wavelengths of the optical signals due to variations in the temperature to which the workpiece is subjected.

3. A fiber optic sensor according to claim 1 further comprising temperature determining means, operably connected to said first and second detectors, for determining the temperature to which the workpiece is subjected based upon the difference between the respective wavelengths of the optical signals detected by said first and second detectors and the first and second predetermined wavelengths, respectively.

4. A fiber optic sensor according to claim 1 wherein said first and second optical sources are coupled to first ends of said first and second optical cores, respectively, and wherein the respective Bragg gratings of said first and second optical cores are disposed at first and second predetermined spatial locations, respectively, relative to the respective first ends of said first and second optical cores, and wherein the first and second predetermined spatial locations are identical.

5. A fiber optic sensor according to claim 1 wherein said first optical core is adapted to transmit optical signals having a first predetermined wavelength of 670 nanometers, and wherein said second optical core is adapted to transmit optical signals having a second predetermined wavelength of 1550 nanometers.

6. A fiber optic sensor according to claim 1 further comprising:

a first optical coupler for coupling said first optical source and said first detector with said first optical core; and a second optical coupler for coupling said second optical source and said second detector with said second optical core.

7. A fiber optic sensor according to claim 1 wherein said first and second optical cores of said multicore optical fiber are doped in different manners such that said first and second optical cores are adapted to preferentially transmit optical signals having different wavelengths.

8. A fiber optic sensor for measuring a temperature to which a workpiece is subjected independent of variations in strain imparted to the workpiece, the fiber optic sensor comprising:

a multicore optical fiber comprising:
  first and second optical cores adapted to transmit optical signals having first and second predetermined wavelengths, respectively, in a single spatial mode, wherein the first and second predetermined wavelengths are different, and wherein said first and second optical cores include a respective Bragg grating at the same relative spatial location which is adapted to reflect optical signals having the first and second predetermined wavelengths, respectively; and
  a cladding layer surrounding each of said first and second optical cores;

first and second optical sources for generating optical signals having first and second predetermined wavelengths, respectively, said first and second optical sources being coupled to said first and second optical cores of said multicore optical fiber, respectively, for transmitting the optical signals therethrough;

first and second detectors, coupled to said first and second optical cores of said multicore optical fiber, respectively, for detecting optical signals reflected by the respective Bragg grating of said first and second optical cores; and temperature determining means, operably connected to said first and second detectors, for determining the temperature to which the workpiece is subjected, independent of variations in the strain imparted to the workpiece, based upon the difference between the respective wavelengths of the optical signals detected by said first and second detectors and the first and second predetermined wavelengths, respectively.

9. A fiber optic sensor according to claim 8 wherein said temperature determining means comprises calibration means comprising:

means for determining the respective wavelength shifts of optical signals originally having first and second predetermined wavelengths due to the application of predetermined amounts of strain to the workpiece which is maintained at a constant temperature; and means for determining the respective wavelength shifts of optical signals originally having first and second predetermined wavelengths as a result of subjecting the workpiece to predetermined temperature variations while maintaining the strain to which the workpiece is subjected constant, such that said temperature determining means determines the temperature to which the workpiece is subjected independent of any differences in the respective wavelengths of the optical signals due to variations in the strain imparted to the workpiece.

10. A fiber optic sensor according to claim 8 further comprising strain determining means, operably connected to said first and second detectors, for determining the strain imparted to the workpiece based upon the difference between the respective wavelengths of the optical signals detected by said first and second detectors and the first and second predetermined wavelengths, respectively.

11. A fiber optic sensor according to claim 8 wherein said first and second optical sources are coupled to first ends of said first and second optical cores, respectively, and wherein the respective Bragg gratings of said first and second optical cores are disposed at first and second predetermined spatial locations, respectively, relative to the respective first ends of said first and second optical cores, and wherein the first and second predetermined spatial locations are identical.

12. A fiber optic sensor according to claim 8 wherein said first optical core is adapted to transmit optical signals having a first predetermined wavelength of 670 nanometers, and wherein said second optical core is adapted to transmit optical signals having a second predetermined wavelength of 1550 nanometers.

13. A fiber optic sensor according to claim 8 further comprising:

a first optical coupler for coupling said first optical source and said first detector with said first optical core; and a second optical coupler for coupling said second optical source and said second detector with said second optical core.

14. A fiber optic sensor according to claim 8 wherein said first and second optical cores of said multicore optical fiber are doped in different manners such that said first and second optical cores are adapted to preferentially transmit optical signals having different wavelengths.

15. A method of sensing a predetermined phenomena to which a workpiece is subjected, independent of other phenomena to which the workpiece is subjected, the method comprising the steps of:

generating first and second optical signals having first and second predetermined wavelengths, respectively, wherein the first and second predetermined wavelengths are different;

coupling the first and second optical signals to first and second optical cores, respectively, of a multicore optical fiber;

transmitting the first and second optical signals in a single spatial mode through the first and second optical cores, respectively, of the multicore optical fiber;

reflecting the optical signals transmitted by the first and second optical cores by first and second Bragg gratings defined by the first and second optical cores, respectively, at the same relative spatial location to thereby create first and second resonance signals, respectively;

detecting the first and second resonance signals reflected by the respective Bragg gratings of the first and second optical cores, respectively; and determining the magnitude of the predetermined phenomena to which the workpiece is subjected, independent of other phenomena to which the workpiece is subjected, based upon the difference between the respective wavelengths of the first and second resonance signals and the first and second predetermined wavelengths, respectively.

16. A method according to claim 15 wherein said determining step comprises the step of determining the strain imparted to the workpiece, independent of variations in the temperature to which the workpiece is subjected, based upon the difference between the respective wavelengths of the first and second resonance signals and the first and second predetermined wavelengths, respectively.

17. A method according to claim 15 wherein said determining step comprises the step of determining the temperature to which the workpiece is subjected, independent of variations in the strain imparted to the workpiece, based upon the difference between the respective wavelengths of the first and second resonance signals and the first and second predetermined wavelengths, respectively.

18. A method according to claim 15 further comprising the step of calibrating the multicore optical fiber prior to said generating step such that the predetermined phenomena can be sensed independent of any differences in the respective wavelengths of the first and second optical signals due to other phenomena, wherein said calibrating step comprises the steps of:

determining the respective wavelength shifts of optical signals originally having first and second predetermined wavelengths due to the application of predetermined amounts of strain to the workpiece while maintaining the workpiece at a constant temperature; and determining the respective wavelength shifts of optical signals originally having first and second predetermined wavelengths as a result of subjecting the workpiece to predetermined temperature variations while maintaining the strain to which the workpiece is subjected constant.

19. A method according to claim 15 further comprising the step of writing a respective Bragg grating on each of the first and second optical cores to reflect optical signals having the first and second predetermined wavelengths, respectively, prior to said generating step.

20. A method according to claim 19 wherein said coupling step comprises the step of coupling the first and second optical signals to first ends of said first and second optical cores, respectively, wherein said writing step comprises the step of writing respective Bragg gratings on the first and second optical cores at first and second predetermined spatial locations, respectively, relative to the respective first ends of the first and second optical cores, and wherein the first and second predetermined spatial locations are identical.

* * * * *